United States Patent
Schonauer (10) Patent No.: US 9,828,211 B2
(45) Date of Patent: Nov. 28, 2017

(54) ACTIVELY DAMPING VERTICAL OSCILLATIONS OF AN ELEVATOR CAR

(75) Inventor: Uwe Schonauer, Berlin (DE)

(73) Assignee: Otis Elevator Company, Farmington, CT (US)

(*) Notice: Subject to any disclaimer, the term of this patent is extended or adjusted under 35 U.S.C. 154(b) by 464 days.

(21) Appl. No.: 14/406,724

(22) PCT Filed: Jun. 20, 2012

(86) PCT No.: PCT/IB2012/001222
§ 371 (c)(1),
(2), (4) Date: Dec. 9, 2014

(87) PCT Pub. No.: WO2013/190342
PCT Pub. Date: Dec. 27, 2013

(65) Prior Publication Data
US 2015/0321880 A1   Nov. 12, 2015

(51) Int. Cl.
B66B 1/34   (2006.01)
B66B 1/40   (2006.01)
B66B 1/32   (2006.01)
B66B 5/02   (2006.01)

(52) U.S. Cl.
CPC .............. *B66B 1/40* (2013.01); *B66B 1/32* (2013.01); *B66B 5/02* (2013.01)

(58) Field of Classification Search
CPC .............. B66B 1/40; B66B 1/32; B66B 5/02
USPC ....... 187/247, 277, 281, 283, 284, 291, 292, 187/391, 393
See application file for complete search history.

(56) References Cited

U.S. PATENT DOCUMENTS

| 4,030,570 A | 6/1977 | Caputo | |
| 4,042,068 A * | 8/1977 | Ostrander | B66B 1/28 187/292 |
| 4,278,150 A * | 7/1981 | Wehrli, III | B66B 1/16 187/293 |
| 4,738,337 A * | 4/1988 | Caputo | B66B 1/28 187/292 |
| 4,923,055 A | 5/1990 | Holland | |

(Continued)

FOREIGN PATENT DOCUMENTS

CN   1134393   10/1996
CN   101269768   9/2008

(Continued)

OTHER PUBLICATIONS

CN office action for CN201280074135.1 dated Oct. 19, 2015.

Primary Examiner — Anthony Salata
(74) Attorney, Agent, or Firm — O'Shea Getz P.C.

(57) ABSTRACT

A system is provided for damping vertical oscillations of an elevator car stopped at an elevator landing. The system includes an elevator traction sheave that receives a torque, a sensor that provides a sensor signal indicative of the torque, a controller that provides a control signal based on the sensor signal, and a motor that applies the torque to the sheave. Oscillations in the torque correspond to the vertical oscillations of the car stopped at the landing during a first (e.g., position control) mode of operation. The motor drives the sensor signal towards a baseline value in response to receiving the control signal during a second (e.g., constant torque control) mode of operation in order to reduce the vertical oscillations of the car.

16 Claims, 5 Drawing Sheets

(56) References Cited

U.S. PATENT DOCUMENTS

| | | | | |
|---|---|---|---|---|
| 4,995,478 | A | * | 2/1991 | Oshima .................... B66B 1/28 187/292 |
| 5,025,896 | A | * | 6/1991 | Arabori ................... B66B 1/28 187/292 |
| 5,077,508 | A | * | 12/1991 | Wycoff ................... B66B 1/32 187/292 |
| 5,322,144 | A | | 6/1994 | Skalski et al. |
| 5,439,075 | A | | 8/1995 | Skalski et al. |
| 5,611,412 | A | | 3/1997 | Yoo et al. |
| 5,652,414 | A | | 7/1997 | Roberts et al. |
| 5,824,975 | A | * | 10/1998 | Hong ..................... H02P 23/16 187/292 |
| 5,862,888 | A | | 1/1999 | Iwakiri et al. |
| 5,896,949 | A | | 4/1999 | Hamdy et al. |
| 6,216,824 | B1 | | 4/2001 | Fuller et al. |
| 6,283,252 | B1 | | 9/2001 | Lee |
| 6,318,505 | B1 | | 11/2001 | De Angelis |
| 6,443,266 | B2 | | 9/2002 | Murakami et al. |
| 6,488,128 | B1 | | 12/2002 | Slabinski |
| 6,959,787 | B2 | | 11/2005 | Husmann |
| 7,178,637 | B2 | | 2/2007 | Asano et al. |
| 7,268,514 | B2 | * | 9/2007 | DeLange ............... B66B 5/0031 187/291 |
| 7,383,924 | B2 | | 6/2008 | Izumi et al. |
| 7,621,377 | B2 | | 11/2009 | Husmann |
| 7,775,330 | B2 | * | 8/2010 | Kattainen ................ B66B 5/04 187/287 |
| 7,946,390 | B2 | | 5/2011 | McNamara et al. |
| 8,360,209 | B2 | * | 1/2013 | Roberts .................... B66B 1/40 187/291 |
| 8,365,873 | B2 | * | 2/2013 | Viita-Aho ............. B66B 5/0031 187/314 |
| 8,757,328 | B2 | * | 6/2014 | Stolt ....................... B66B 1/304 187/393 |
| 9,457,987 | B2 | * | 10/2016 | Della Porta ............... B66B 1/32 |
| 2006/0289245 | A1 | | 12/2006 | Asami et al. |

FOREIGN PATENT DOCUMENTS

| | | |
|---|---|---|
| EP | 1584597 | 10/2005 |
| JP | 07257831 | 10/1995 |
| JP | 2003095546 | 4/2003 |
| JP | 2010280458 | 12/2010 |
| JP | 2011063427 | 3/2011 |
| JP | 2011111303 | 6/2011 |

* cited by examiner

ACTIVELY DAMPING VERTICAL OSCILLATIONS OF AN ELEVATOR CAR

This application is entitled to the benefit of, and incorporates by reference essential subject matter disclosed in PCT Application No. PCT/IB2012/001222 filed on Jun. 20, 2012.

BACKGROUND OF THE INVENTION

1. Technical Field

This disclosure relates generally to an elevator and, more particularly, to a system and method for actively damping vertical oscillations of an elevator car.

2. Background Information

An elevator typically includes a plurality of belts or ropes that move an elevator car vertically within a hoistway between a plurality of landings. When the elevator car is stopped at a respective one of the landings, changes in magnitude of a load within the car can cause changes in vertical position of the car relative to the landing. The elevator car can move vertically down relative to the landing, for example, when one or more passengers and/or cargo move from the landing into the car. In another example, the elevator car can move vertically up relative to the landing when one or more passengers and/or cargo move from the car onto the landing. Such changes in the vertical position of the elevator car can be caused by soft hitch springs and/or stretching and/or contracting of the belts or ropes, particularly where the elevator has a relatively large travel height and/or a relatively small number of belts or ropes. Under certain conditions, the stretching and/or contracting of the ropes or belts and/or hitch springs can create disruptive oscillations in the vertical position of the elevator car; e.g., an up and down car motion.

SUMMARY OF THE DISCLOSURE

According to an aspect of the invention, a system is provided for damping vertical oscillations of an elevator car stopped at an elevator landing. The system includes an elevator traction sheave that receives a torque, a sensor that provides a sensor signal indicative of the torque, a controller that provides a control signal based on the sensor signal, and a motor that applies the torque to the sheave, where the motor can also be configured as the sensor. Oscillations in the torque correspond to the vertical oscillations of the car stopped at the landing during a first mode of operation. The motor drives the sensor signal towards a baseline value (e.g., regulates the torque applied to the sheave) in response to receiving the control signal during a second mode of operation in order to reduce the vertical oscillations of the car.

Alternatively or in addition to this or other aspects of the invention, the first mode of operation is a (e.g., constant) position control mode of operation, and the second mode of operation is a (e.g., constant) torque control mode of operation.

Alternatively or in addition to this or other aspects of the invention, the motor may rotate the sheave (e.g., intermittently in opposing directions) during the driving of the sensor signal towards the baseline value in order to damp the vertical oscillations of the car.

Alternatively or in to this or other aspects of the invention, the controller provides the control signal where an amplitude of at least a portion (e.g., one half) of at least one oscillation in the sensor signal is greater than a threshold.

Alternatively or in addition to this or other aspects of the invention, the controller determines the baseline value based on changes in the sensor signal during at least a portion of at least one of the vertical oscillations of the car. The baseline value may be substantially equal to an average of the sensor signal during the at least one of the vertical oscillations of the elevator car.

Alternatively or in addition to this or other aspects of the invention, the controller monitors the sensor signal during the second mode of operation, and provides a second control signal when: (i) an amplitude of at least a portion of at least one oscillation in the monitored sensor signal is less than a threshold; and/or (ii) the monitored sensor signal becomes substantially constant. The motor holds the sheave at an angular position, or moves it in a position-controlled or velocity-controlled manner, in response to receiving the second control signal during a third mode of operation.

Alternatively or in addition to this or other aspects of the invention, the system also includes a brake operable to hold the sheave at an angular position in response to receiving a second control signal during a third mode of operation. The controller monitors the sensor signal during the second mode of operation, and provides the second control signal when: (i) an amplitude of at least a portion of at least one oscillation in the monitored sensor signal is less than a threshold; and/or (ii) the monitored sensor signal becomes substantially constant.

Alternatively or in addition to this or other aspects of the invention, the system also includes a second sensor that provides a second sensor signal indicative of an angular position of the sheave. The controller signals the motor to hold the sheave at a substantially constant angular position during at least one of the vertical oscillations of the elevator car where a change in the second sensor signal is greater than a second threshold. The controller determines at least one of an approximate maximum and an approximate minimum of the second sensor signal during the at least one of the vertical oscillations of the elevator car. The controller subsequently signals the motor to drive the sensor signal towards the baseline value (i) approximately when or (ii) at a predetermined point in time after the maximum or the minimum of the sensor signal is reached.

Alternatively or in addition to this or other aspects of the invention, the system also includes a second sensor that provides a second sensor signal indicative of an angular position of the sheave, and a brake that holds the sheave at a substantially constant angular position during at least one of the vertical oscillations of the elevator car where a change in the second sensor signal is greater than a second threshold. The controller determines an approximate maximum and/or m approximate minimum of the second sensor signal during the at least one of the vertical oscillations of the elevator car. The controller subsequently signals the motor to drive the sensor signal towards the baseline value (i) approximately when or (ii) at a predetermined point in time after the maximum or the minimum of the sensor signal is reached.

According to another aspect of the invention, a method is provided for damping vertical oscillations of an elevator car stopped at an elevator landing, where oscillations in a torque applied by a motor to an elevator traction sheave during a first mode of operation correspond to the vertical oscillations of the car. The method includes steps of: (i) receiving a sensor signal indicative of the torque received by the sheave; (ii) processing the sensor signal with a controller to provide a control signal to the motor; and (iii) driving the sensor signal towards a baseline value with the motor in response to receiving the control signal, where the driving of the sensor signal towards the baseline value reduces the vertical oscillations of the car.

Alternatively or in addition to this or other aspects of the invention, the first mode of operation is a (e.g., constant) position control mode of operation, and the second mode of operation is a (e.g., constant) torque control mode of operation.

Alternatively or in addition to this or other aspects of the invention, the step of driving of the sensor signal towards the baseline value causes the sheave to rotate, for example, intermittently in opposing directions. The rotating of the sheave damps the vertical oscillations of the car.

Alternatively or in addition to this or other aspects of the invention, the controller provides the control signal where an amplitude of at least a portion of at least one oscillation in the sensor signal is greater than a threshold.

Alternatively or in addition to this or other aspects of the invention, the method also includes a step of determining the baseline value with the controller based on changes in the sensor signal during at least a portion of at least one of the vertical oscillations of the car. The baseline value may be substantially equal to an average of the sensor signal during the at least one of the vertical oscillations of the car.

Alternatively or in addition to this or other aspects of the invention, the method also includes steps of: (i) monitoring the sensor signal during the second mode of operation; and (ii) holding the sheave at an angular position where (a) changes in the monitored sensor signal are less than a threshold and/or (b) the monitored sensor signal becomes substantially constant.

Alternatively or in addition to this or other aspects of the invention, the method also includes steps of: (i) receiving a second sensor signal indicative of an angular position of the sheave; (ii) holding the sheave at a substantially constant angular position during at least one of the vertical oscillations of the car where a change in the second sensor signal is greater than a second threshold; (iii) determining at least one of an approximate maximum and an approximate minimum of the second sensor signal during the at least one of the vertical oscillations of the elevator car; and (iv) driving the sensor signal towards the baseline value approximately when or at a predetermined point in time after the maximum or the minimum of the sensor signal is reached.

Alternatively or in addition to this or other aspects of the invention, the vertical oscillations of the elevator car are caused by intermittent stretching and contracting of one or more tension members connecting the car to the sheave.

Alternatively or in addition to this or other aspects of the invention, one or more of the tension members is a belt.

Alternatively or in addition to this or other aspects of the invention, one or more of the tension members is a rope.

The foregoing features and the operation of the invention will become more apparent in light of the following description and the accompanying drawings.

DETAILED DESCRIPTION OF THE INVENTION

Figure 1:
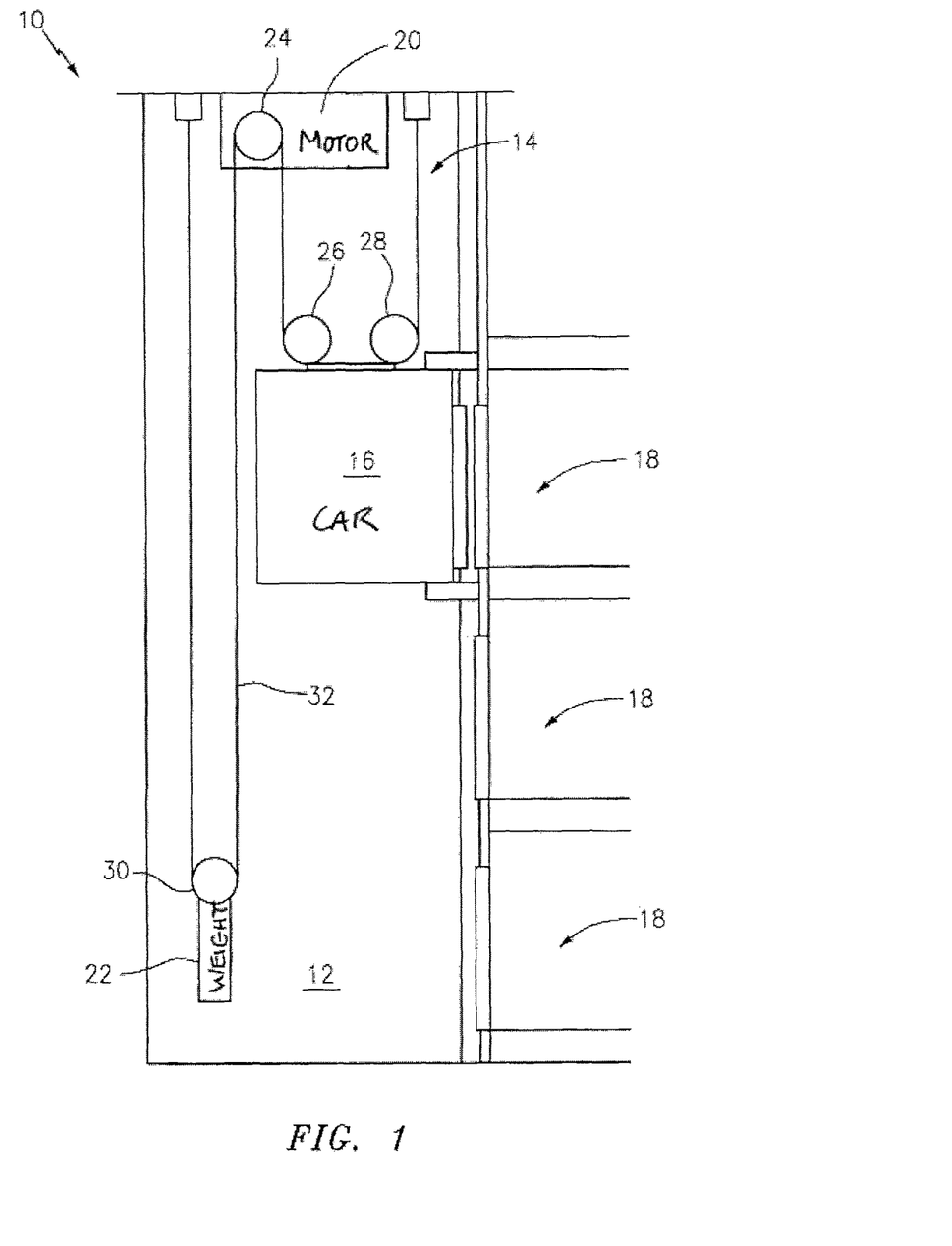
FIG. 1 is a diagrammatic illustration of an elevator.

FIG. 1 illustrates an elevator 10 (e.g., a traction elevator) arranged in a building hoistway 12. The elevator 10 includes an elevator lift system 14 that moves an elevator car 16 vertically within the hoistway 12 between, for example, a plurality of elevator landings 18.

The lift system 14 includes a motor 20 (e.g., an electric step motor), a counterweight 22, a plurality of elevator sheaves 24, 26, 28 and 30, and one or more elevator tension members 32 (e.g., anchored ropes, belts, etc.). A first of the sheaves 24 (e.g., a traction sheave) is rotatably connected to the motor 20. A second of the sheaves 26 (e.g., an idler sheave) and a third of the sheaves 28 (e.g., an idler sheave) are rotatably connected to the elevator car 16. A fourth of the sheaves 30 (e.g., an idler sheave) is rotatably connected to the counterweight 22. The tension members 32 are engaged with (e.g., serpentined around) the elevator sheaves 24, 26, 28 and 30, and connect the motor 20 to the elevator car 16 and the counterweight 22. The present invention, however, is not limited to any particular lift system components and/or configurations.

Figure 2:
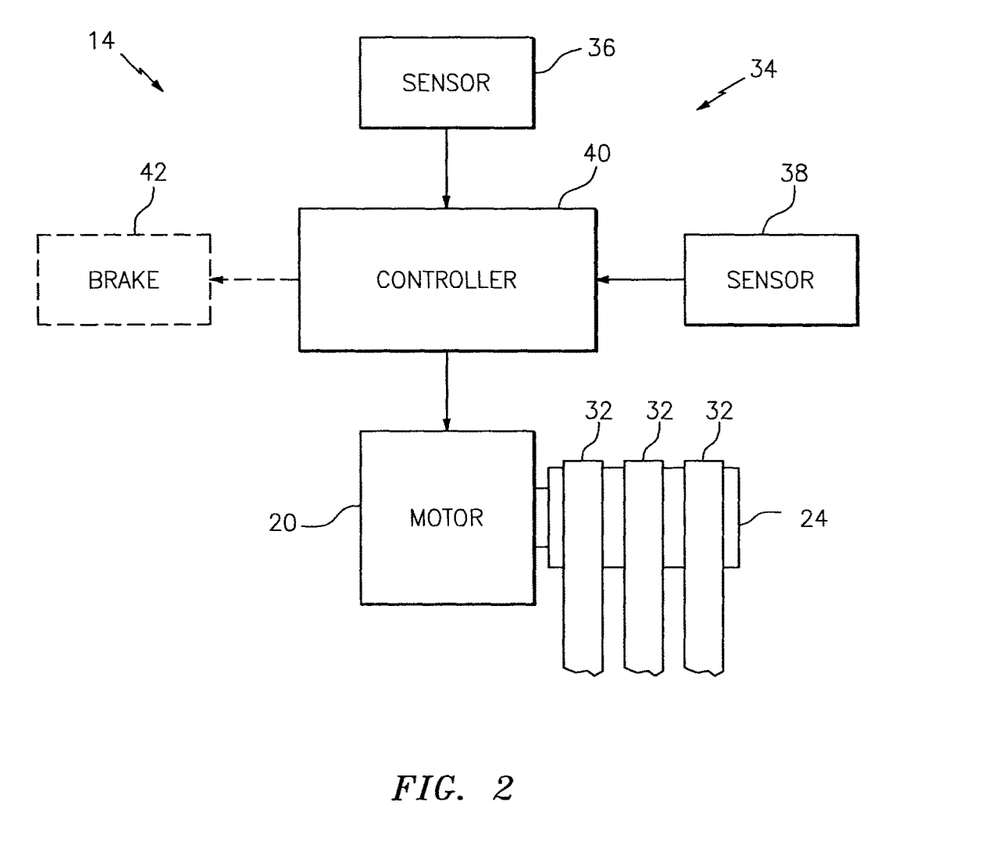
FIG. 2 is a schematic block diagram of an elevator control system.

Referring to FIG. 2, the lift system 14 also includes an elevator control system 34 in signal communication (e.g., hardwired or wirelessly connected) with the motor 20. The control system 34 includes a sheave position sensor 36, a sheave torque sensor 38 and a controller 40.

The position sensor 36 is adapted to provide a position sensor signal indicative of a relative angular (e.g., rotational) position of the first sheave 24. An example of the position sensor 36 is a sensor that determines a relative angular position of a coil in the motor 20, which can directly correspond to the angular position of the first sheave 24. The present invention, however, is not limited to any particular position sensor type or configuration.

The torque sensor 38 is adapted to provide a torque sensor signal indicative of a torque applied by the motor 20 onto the first sheave 24, where the torque corresponds to a relative overall load (e.g., weight) of the elevator car 16 that is applied on the first sheave 24 by the tension members 32. An example of the torque sensor 38 is a sensor that measures current or voltage drawn by the motor 20 to maintain or change the angular position of the first sheave 24. The measured current or voltage corresponds to the torque received by the first sheave 24, and can be converted into torque using a current/torque conversion equation or matrix. The present invention, however, is not limited to any particular torque sensor type or configuration.

The controller 40 can be implemented using hardware, software, or a combination thereof. The hardware can include one or more processors, memory, analog and/or digital circuitry, etc. The controller 40 is in signal communication with the position sensor 36, the torque sensor 38 and the motor 20.

During operation of the lift system 14 of FIGS. 1 and 2, the controller 40 signals the motor 20 to move the elevator car 16 between a plurality of the landings 18. The motor 20, for example, selectively rotates the first sheave 24 to move the tension members 32 about the other sheaves 26, 28 and 30. The movement of the tension members 32 causes the elevator car 16 and the counterweight 22 to respectively move (e.g., lift or lower) vertically within the hoistway 12 between the landings 18.

When the elevator car 16 is stopped at a landing 18, one or more passengers and/or cargo can move between the elevator car 16 and the landing 18. Such movement can change the magnitude of the overall load (e.g., weight) of the elevator car 16, which can cause the tension members 32 to longitudinally stretch and/or contract. The tension members 32 may stretch, for example, when passengers and/or cargo move from the landing 18 into the elevator car 16 since the weight of the passengers and/or cargo is added to the weight of the elevator car 16. In another example, the tension members 32 may contract when passengers and/or cargo move from the elevator car 16 onto the landing 18 since the weight of the passengers and/or cargo is subtracted from the overall weight of the elevator car 16.

Under certain conditions, the stretching and contracting of the tension members 32 can cause the elevator car 16 to vertically oscillate (e.g., move up and down) relative to the landing 18. Such vertical oscillations can be unnerving for the passengers in the elevator car 16 as well as create potential injury hazards (e.g., tripping hazards) for passengers entering or leaving the elevator car 16.

Figure 3:
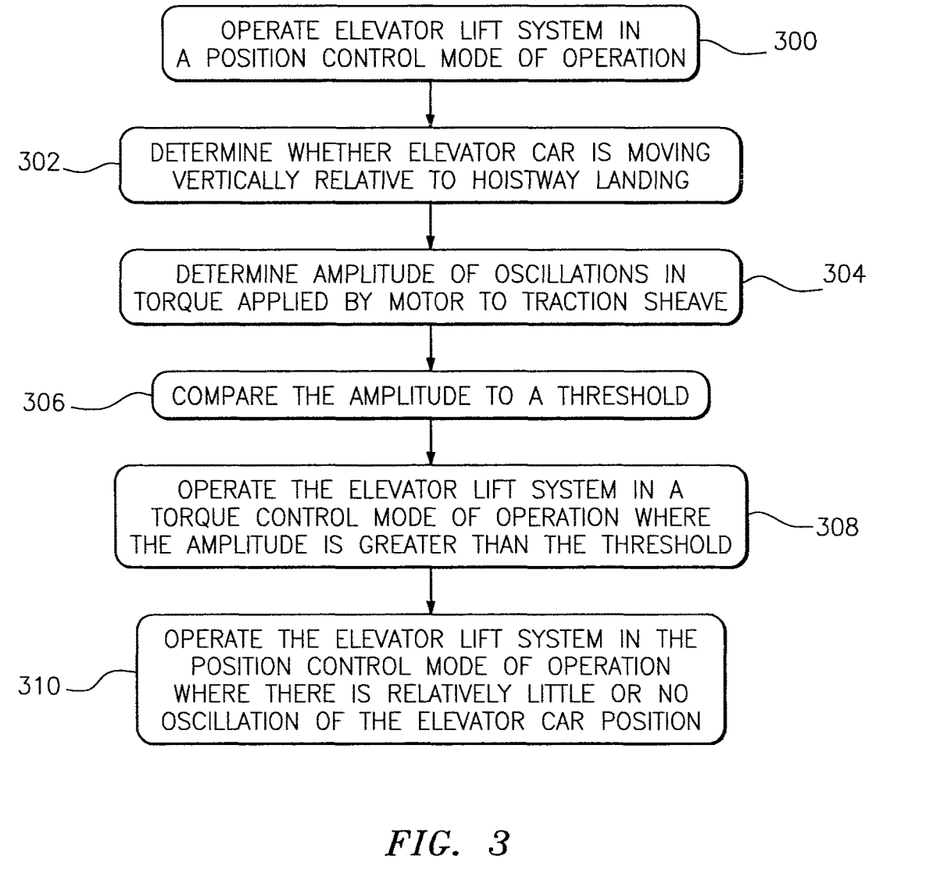
FIG. 3 is a flow diagram of a method for damping vertical oscillations of an elevator car stopped at an elevator landing using an elevator lift system.
Figure 4:
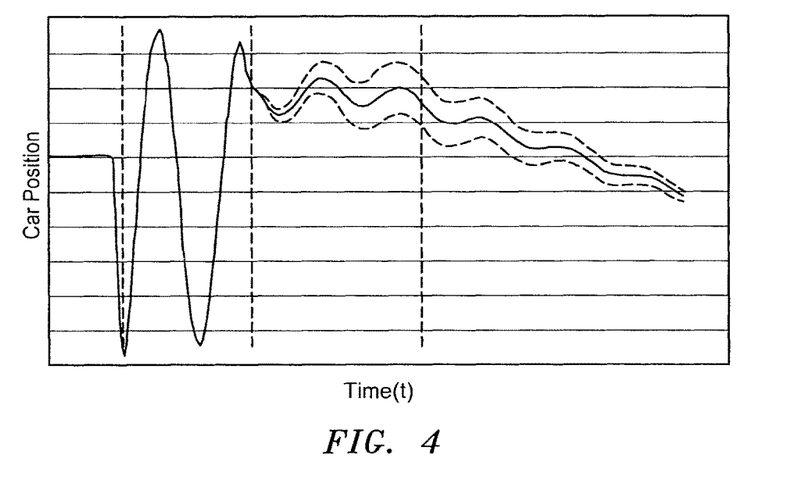
FIG. 4 is a graphic illustration of a vertical position of the elevator car as a function of time during the method of FIG. 3.

FIG. 3 is a flow diagram of a method for damping the vertical oscillations of the elevator car 16 while stopped at the elevator landing 18 using the lift system 14 of FIGS. 1 and 2. FIG. 4 is a graphical illustration of the vertical position of the elevator car 16 as a function of time during the method of FIG. 3.

In step 300, the lift system 14 is operated according to a position control mode. The controller 40 utilizes the position sensor 36 and the motor 20 in a feedback loop, for example, to maintain the first sheave 24 at a substantially constant angular position. The position sensor 36, for example, provides the position sensor signal to the controller 40. The controller 40 subsequently signals the motor 20, via a first control signal, to regulate the torque applied by the motor 20 to the first sheave 24 in order to prevent rotation of the first sheave 24. The motor 20 can increase the torque applied to the first sheave 24, for example, to accommodate an increase in the overall load of the elevator car 16; e.g., when passengers and/or cargo move into the elevator car 16. The motor 20 can decrease the torque applied to the first sheave 24, for example, to accommodate a decrease in the overall load of the elevator car 16; e.g., when passengers and/or cargo move onto the landing 18.

In step 302, the controller 40 determines whether the elevator car 16 is moving vertically relative to the landing 18 based on, for example, the torque applied by the motor 20 onto the first sheave 24. The torque sensor 38, for example, provides the torque sensor signal to the controller 40. The controller 40 monitors the received torque sensor signal to determine whether the torque received by the first sheave 24 is substantially constant or changes (e.g., increases and/or decreases) over time. The controller 40 determines the torque is substantially constant where, for example, the torque sensor signal is substantially constant. The controller 40 determines the torque is changing where, for example, the torque sensor signal changes over time.

The controller 40 can determine there is relatively little or no vertical movement between the elevator car 16 and the landing 18 where the torque sensor signal is substantially constant. The torque sensor signal can be substantially constant, for example, where there is little or no net change in the overall load of the elevator car 16; e.g., where the weight of passengers and/or cargo leaving the car is approximately equal to the weight of passengers and/or cargo entering the car, etc.

The controller 40 can also determine there is relatively little or no vertical movement between the elevator car 16 and the landing 18 where the torque sensor signal increases or decreases a relatively small amount over time. The torque sensor signal can increase, for example, where passengers and/or cargo move from the landing 18 into the elevator car 16 since the motor 20 applies additional torque to the first sheave 24 to accommodate the increase in the overall load of the elevator car 16. The torque sensor signal can decrease, for example, where passengers and/or cargo move from the elevator car 16 to landing 18 since the motor 20 applies less torque to the first sheave 24 to accommodate the decrease in the overall load of the elevator car 16.

The controller 40 can determine that the elevator car 16 is moving vertically relative to the landing 18 where the torque sensor signal increases and decreases (e.g., oscillates) over time. The torque sensor signal and, thus, the torque applied by the motor 20 onto the first sheave 24 may oscillate, for example, where the tension members 32 repeatedly stretch and contract after passengers and/or cargo move between the elevator car 16 and the landing 18. During tension member stretching, for example, the elevator car 16 can move in a vertical downward direction, which increases the overall load of the elevator car 16 relative to the first sheave 24. The torque sensor signal therefore increases since the motor 20 applies additional torque to the first sheave 24 to accommodate the increase in the relative overall load of the elevator car 16. During tension member contracting, for example, the elevator car 16 may move in a vertical upward direction, which decreases the overall load of the elevator car 16 relative to the first sheave 24. The torque sensor signal therefore decreases since the motor 20 applies less torque to the first sheave 24 to accommodate the decrease in the relative overall load of the elevator car 16.

In step 304, the controller 40 determines an amplitude of the oscillations of the torque sensor signal where the elevator car 16 is moving vertically relative to the landing 18. The amplitude may be determined, for example, by subtracting an approximate minimum torque sensor signal from an approximate maximum torque sensor signal for a given vertical oscillation of the elevator car 16 and, thus, a given oscillation of the torque sensor signal. Alternatively, the amplitude may be an averaged amplitude for a plurality of given vertical oscillations of the elevator car 16. Oscillations in the torque sensor signal exhibiting a relatively small amplitude correspond to relatively small vertical oscillations of the elevator car 16. Oscillations in the torque sensor signal exhibiting a relatively large amplitude correspond to relatively large vertical oscillations of the elevator car 16.

In step 306, the controller 40 compares the amplitude of the oscillations in the torque sensor signal to a first torque threshold.

In step 308, the lift system 14 switches to a torque control mode where the amplitude of the oscillations of the torque sensor signal is greater than the first torque threshold. The controller 40 utilizes the torque sensor 38 and the motor 20 in a feedback loop to maintain the torque applied by the motor 20 onto the first sheave 24, for example, at a substantially constant value. The controller 40, for example, determines a baseline value that corresponds to a predicted torque sensor signal at which the loaded or unloaded elevator car 16 will remain in a substantially stationary vertical position at the landing 18. The baseline value is determined based on the changes in the torque sensor signal during one or more (e.g., complete) vertical oscillations of the elevator car 16. In one embodiment, for example, the baseline value is substantially equal to an average of the torque sensor signal during a first of the vertical oscillations of the elevator car 16. Alternatively, the baseline value can be determined based on the changes in the torque sensor signal during a portion (e.g., one half) of one of the vertical oscillations of the elevator car 16.

The controller 40 signals the motor 20, via a second control signal, to regulate the torque applied to the first sheave 24 in order to drive the torque sensor signal towards (e.g., to) the baseline value, which may cause the first sheave 24 to rotate, for example, intermittently in opposite directions. The motor 20 may rotate the first sheave 24 in a first (e.g., clockwise) direction to decrease the torque sensor signal where, for example, the torque sensor signal is above the second baseline value. The motor 20 may rotate the first sheave 24 in a second (e.g., counter-clockwise) direction to increase the torque sensor signal where, for example, the torque sensor signal is below the second baseline value. In this manner, the lift system 14 can reduce the amplitude of the changes in (e.g., oscillations of) the torque applied by the motor 20 to the first sheave 24 and therefore damp the vertical oscillations of the elevator car 16.

In step 310, the controller 40 determines whether the elevator car 16 is still oscillating vertically relative to the landing 18 based on, for example, the torque sensor signal during or after the performance of the step 308. For example, the controller 40 can determine there is relatively little or no vertical oscillation between the elevator car 16 and the landing 18 where the torque sensor signal is substantially constant over a (e.g., predetermined) period of time. In another example, the controller 40 can determine there is relatively little or no vertical oscillation between the elevator car 16 and the landing 18 where the amplitude of the oscillations of the torque sensor signal is below a second torque threshold, which may be equal to, greater than or less than the first torque threshold. Where the controller 40 determines there is relatively little or no vertical oscillation between the elevator car 16 and the landing 18, the lift system 14 may revert back into the position control mode of operation.

In some embodiments, for example as illustrated in FIG. 2, the lift system 14 can include a mechanical brake 42 (e.g., a sheave brake and/or motor brake) operable to prevent rotation of the first sheave 24 during the position control mode of operation.

In some embodiments, the control system 34 can include an elevator car position sensor operable to directly determine the position of the elevator car 16 relative to one or more of the landings 18. Such a car position sensor may be used to supplement, backup or replace the sheave position sensor 36.

Figure 5:
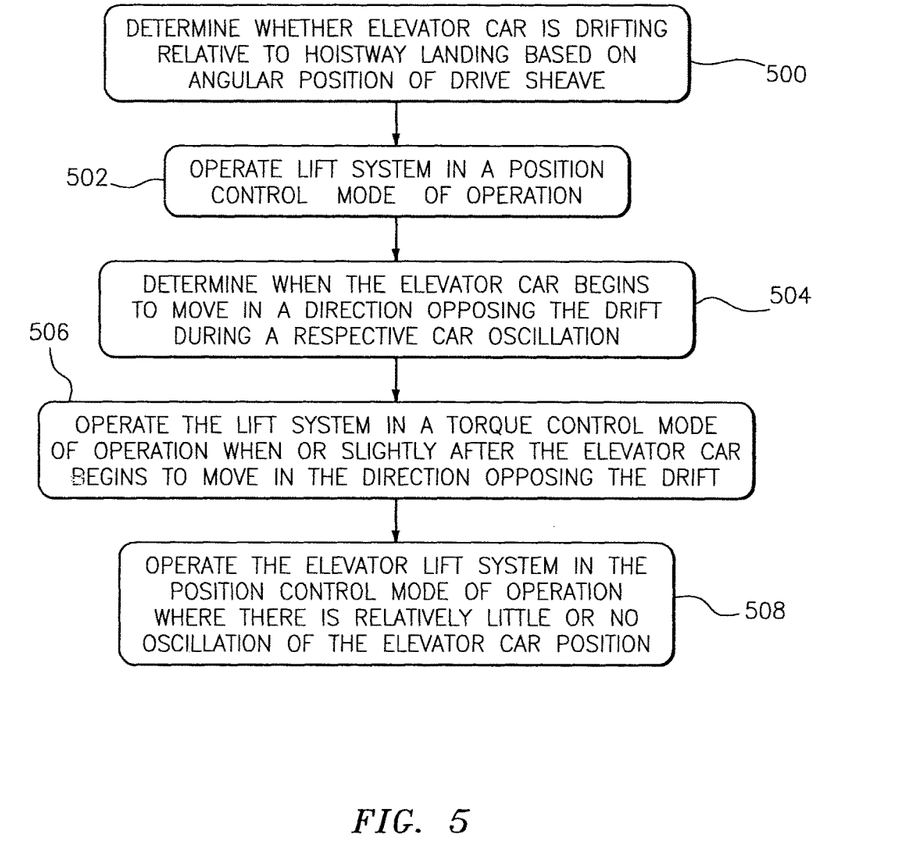
FIG. 5 is a flow diagram of a method for reducing elevator car drift during an embodiment of the method of FIG. 3.
Figures 6A, 6B:
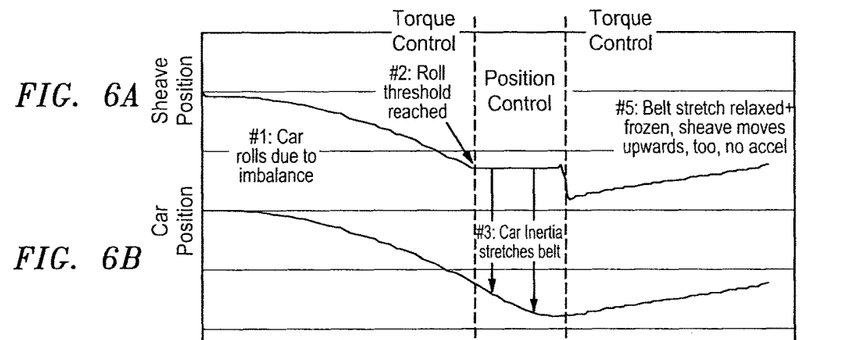
FIG. 6A is a graphical illustration of angular position of a traction sheave as a function of time during a portion of the method of FIG. 5.
FIG. 6B is a graphical illustration of vertical position of the elevator car as a function of time during a portion of the method of FIG. 5.
Figure 6C:
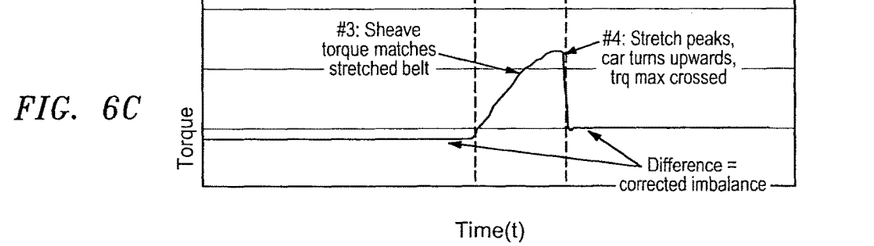
FIG. 6C is a graphical illustration of torque exhibited by the traction sheave as a function of time during a portion of the method of FIG. 5.

Under certain conditions, the elevator car 16 may drift (e.g., move up or down) relative to the landing 18 during, for example, performance of the method of FIG. 3. FIG. 5 is a flow diagram of a method for reducing elevator car 16 drift during, for example, the torque control mode of the step 308. FIG. 6A is a graphical illustration of the angular position of the first sheave 24 as a function of time during a portion of the method of FIG. 5. FIG. 6B is a graphical illustration of the vertical position of the elevator car 16 as a function of time during a portion of the method of FIG. 5. FIG. 6C is a graphical illustration of the torque received by the first sheave 24 as a function of time during a portion of the method of FIG. 5.

In step 500, the controller 40 determines whether the elevator car 16 is drifting relative to the landing 18 based on, for example, the angular position of the first sheave 24. The position sensor 36, for example, provides the position sensor signal to the controller 40. The controller 40 monitors the received position sensor signal to determine whether the first sheave 24 is stationary or rotating. The controller 40 determines the first sheave 24 is stationary where, for example, the position sensor signal is substantially constant. The controller 40 determines the first sheave 24 is rotating where, for example, the position sensor signal changes over time. Where the first sheave 24 is rotating, the controller 40 compares an amplitude of the changes in the position sensor signal to a position threshold. The controller 40 can subsequently determine the elevator car 16 is drifting where, for example, the amplitude of the changes in the position sensor signal is greater than the position threshold. Alternatively, the controller 40 can determine there is relatively little or no elevator car drift where, for example, the amplitude of the changes in the position sensor signal is less than the position threshold.

In step 502, the lift system 14 switches to the position control mode where the elevator car 16 is drifting relative to the landing 18; e.g., the change (e.g., displacement) in the position sensor signal is greater than the position threshold. The controller 40, for example, utilizes the position sensor 36 and the motor 20 in the feedback loop to maintain the first sheave 24 at a substantially constant angular position as described above in step 300.

In step 504, the controller 40 determines when the elevator car 16 begins to move vertically in a direction opposing the elevator car 16 drift during a respective elevator car 16 oscillation. The torque sensor 38, for example, provides the torque sensor signal to the controller 40. The controller 40 subsequently compares the received (e.g., $t_{i+1}$) torque sensor signal to a previously received (e.g., $t_i$) torque sensor signal to determine when an approximate maximum (or minimum) torque sensor signal is reached in a respective one of the vertical oscillations of the elevator car 16, where "t" is a time step.

In step 506, the lift system 14 resumes the torque control mode of the step 308 approximately at or slightly (e.g., a predetermined point in time) after a point in time when the torque sensor signal reaches the maximum (or minimum) torque sensor signal. In this manner, there is a slight elevator car 16 motion in the direction opposing the elevator car 16 drift when the controller 40 signals the motor 20 to drive the torque sensor signal towards the baseline value, which can reduce the elevator car 16 drift.

In step 508, the controller 40 determines whether the elevator car 16 is still oscillating vertically relative to the landing 18 based on, for example, the torque sensor signal during or after the performance of the step 506 (e.g., the step 308). Where the controller 40 determines there is relatively little or no vertical oscillation of the elevator car 16, the lift system 14 may revert back into the position control mode of operation.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A system for damping vertical oscillations of an elevator car stopped at an elevator landing, the system comprising:
    an elevator traction sheave operable to receive a torque, wherein oscillations in the torque correspond to the vertical oscillations of the car stopped at the landing during a first mode of operation;
    a sensor operable to provide a sensor signal indicative of the torque;
    a controller operable to provide a control signal based on the sensor signal; and
    a motor operable to apply the torque to the sheave and drive the sensor signal towards a baseline value in response to receiving the control signal during a second mode of operation, wherein the driving of the sensor signal towards the baseline value reduces the vertical oscillations of the car;
    wherein the controller is operable to determine the baseline value based on changes in the sensor signal during at least a portion of at least one of the vertical oscillations of the car, and the baseline value is substantially equal to an average of the sensor signal during the at least one of the vertical oscillations of the elevator car.

2. The system of claim 1, wherein the first mode of operation comprises a position control mode of operation, and the second mode of operation comprises a constant torque control mode of operation.

3. The system of claim 1, wherein the motor is operable to rotate the sheave during the driving of the sensor signal towards the baseline value, and wherein the rotating of the sheave damps the vertical oscillations of the car.

4. The system of claim 1, wherein the controller is operable to provide the control signal where an amplitude of at least a portion of at least one oscillation in the sensor signal is greater than a threshold.

5. The system of claim 1, wherein
    the controller is operable to monitor the sensor signal during the second mode of operation, and to provide a second control signal where one of:
        an amplitude of at least a portion of at least one oscillation in the monitored sensor signal is less than a threshold; and
        the monitored sensor signal becomes substantially constant; and
    the motor is operable to hold the sheave at an angular position in response to receiving the second control signal and revert back from the second mode of operation to the first mode of operation.

6. The system of claim 1, further comprising a brake operable to hold the sheave at an angular position in response to receiving a second control signal;
    wherein the motor reverts back to the first mode of operation from the second mode of operation upon provision of the second control signal; and
    wherein the controller is operable to monitor the sensor signal during the second mode of operation, and to provide the second control signal where one of:
        an amplitude of at least a portion of at least one oscillation in the monitored sensor signal is less than a threshold; and
        the monitored sensor signal becomes substantially constant.

7. The system of claim 1, further comprising a second sensor operable to provide a second sensor signal indicative of an angular position of the sheave, wherein the controller is operable to
    signal the motor to hold the sheave at a substantially constant angular position during at least one of the vertical oscillations of the elevator car where a change in the second sensor signal is greater than a second threshold;
    determine at least one of an approximate maximum and an approximate minimum of the second sensor signal during the at least one of the vertical oscillations of the elevator car; and
    signal the motor to drive the sensor signal towards the baseline value approximately when or at a predetermined point in time after the maximum or the minimum of the sensor signal is reached.

8. The system of claim 1, further comprising
    a second sensor operable to provide a second sensor signal indicative of an angular position of the sheave; and
    a brake operable to hold the sheave at a substantially constant angular position during at least one of the vertical oscillations of the elevator car where a change in the second sensor signal is greater than a second threshold;
    wherein the controller is operable to determine at least one of an approximate maximum and an approximate minimum of the second sensor signal during the at least one of the vertical oscillations of the elevator car, and signal the motor to drive the sensor signal towards the baseline value approximately when or at a predetermined point in time after the maximum or the minimum of the sensor signal is reached.

9. A method for damping vertical oscillations of an elevator car stopped at an elevator landing, wherein oscillations in a torque applied by a motor to an elevator traction sheave during a first mode of operation correspond to the vertical oscillations of the car, the method comprising:
    receiving a sensor signal indicative of the torque received by the sheave;
    processing the sensor signal with a controller to provide a control signal to the motor;
    driving the sensor signal towards a baseline value with the motor in response to receiving the control signal, wherein the driving of the sensor signal towards the baseline value reduces the vertical oscillations of the car; and
    determining the baseline value with the controller based on changes in the sensor signal during at least a portion of at least one of the vertical oscillations of the car, wherein the baseline value is substantially equal to an average of the sensor signal during the at least one of the vertical oscillations of the car.

10. The method of claim 9, wherein
    the first mode of operation comprises a position control mode of operation; and
    the sensor signal is driven towards the baseline value during a second mode of operation that comprises a constant torque control mode of operation.

11. The method of claim 9, wherein the driving of the sensor signal towards the baseline value causes the sheave to rotate, and wherein the rotating of the sheave damps the vertical oscillations of the car.

12. The method of claim 9, wherein the controller provides the control signal where an amplitude of at least a portion of at least one oscillation in the sensor signal is greater than a threshold.

13. The method of claim 9, further comprising
monitoring the sensor signal during a second mode of operation; and
holding the sheave at an angular position where one of
 changes in the monitored sensor signal are less than a threshold; and
 the monitored sensor signal becomes substantially constant.

14. The method of claim 9, further comprising
receiving a second sensor signal indicative of an angular position of the sheave;
holding the sheave at a substantially constant angular position during at least one of the vertical oscillations of the car where a change in the second sensor signal is greater than a second threshold;
determining at least one of an approximate maximum and an approximate minimum of the second sensor signal during the at least one of the vertical oscillations of the elevator car; and
driving the sensor signal towards the baseline value approximately when or at a predetermined point in time after the maximum or the minimum of the sensor signal is reached.

15. The method of claim 9, wherein the vertical oscillations of the elevator car are caused by intermittent stretching and contracting of one or more tension members connecting the car to the sheave.

16. The method of claim 15, wherein one or more of the tension members comprises a belt.

* * * * *